United States Patent [19]

Aschwanden

[11] Patent Number: 5,032,917
[45] Date of Patent: Jul. 16, 1991

[54] VIDEO SIGNAL BLENDING APPARATUS

[75] Inventor: Felix Aschwanden, Thalwil, Switzerland

[73] Assignee: RCA Licensing Corporation, Princeton, N.J.

[21] Appl. No.: 491,997

[22] Filed: Mar. 12, 1990

[51] Int. Cl.$^5$ .............................. H04N 5/262
[52] U.S. Cl. ...................... 358/183; 358/22
[58] Field of Search ............ 358/12, 141, 142, 183, 358/22

[56] References Cited

U.S. PATENT DOCUMENTS

| | | | |
|---|---|---|---|
| 4,395,733 | 7/1983 | Elenbaas | 358/183 |
| 4,827,344 | 5/1989 | Astle et al. | 358/183 |
| 4,855,811 | 8/1989 | Isnardi | 358/12 |
| 4,951,144 | 8/1990 | Des Jardins | 358/183 |
| 4,970,595 | 11/1990 | Bloomfield | 358/183 |

OTHER PUBLICATIONS

Cavallerano, "Decomposition and Recombination of a Wide Aspect Ratio Image for ENTSC Two-Channel Television", IEEE Transactions on Consumer Electronics, vol. CE-33, No. 3, Aug. 1987, pp. 162–172.
LoCicero, "Edge Stitching of a Wide-Aspect Ratio HDTV Image", IEEE Transactions, 1986, pp. 436–440.
LoCicero, "Image Reconstruction in a Wide Aspect Ratio HDTV System", IEEE Transactions, 1986.

*Primary Examiner*—John W. Shepperd
*Assistant Examiner*—Sherrie Hsia
*Attorney, Agent, or Firm*—Joseph S. Tripoli; Eric P. Herrmann; Ronald H. Kurdyla

[57] ABSTRACT

A first video signal component and a second video signal component represent constituent portions of an image to be displayed. An analog signal blending network blends these components together along a boundary region several pixels wide to reconstitute a video signal representing the image to be displayed. The blending network includes first and second active analog devices which exhibit mutually opposite gain over the boundary region to response to a common gain control signal, to produce a virtually invisible seam along the boundary region.

10 Claims, 6 Drawing Sheets

VIDEO SIGNAL BLENDING APPARATUS

FIELD OF THE INVENTION

This invention concerns apparatus for blending constituent components of an image representative video signal along a boundary region to develop an image signal for display.

BACKGROUND OF THE INVENTION

In a video signal processing system it may be necessary to join together or process constituent components of an image representative signal so as to construct or reconstitute an image suitable for viewing. This need may arise, for example, in the case of a widescreen television signal processing system which processes an image representative television signal having an image aspect ratio (e.g., 5:3 or 16:9) greater than the 4:3 aspect ratio of a standard television image. In a widescreen television system the video information may be encoded before transmission to produce separate center panel information and left and right side panel information. The center panel information often exhibits a standard 4:3 aspect ratio to be compatible with existing standard television receivers in the same fashion as a conventional (non-widescreen) television signal. In the case of a widescreen television receiver, the separated center and side panel image information must be processed to reconstitute the original widescreen signal before the image is displayed.

In the process of reconstituting the original widescreen signal it is important that the region along which the center and side information are joined does not exhibit a visible seam or annoying artifacts. This could be accomplished easily by means of a sophisticated digital signal processing system. However, it is herein recognized that relatively economical and uncomplicated apparatus is desirable for this purpose, particularly for use in inexpensive video signal processing systems including low cost television receivers and video tape recorders. Such apparatus is disclosed in accordance with the principles of the present invention.

SUMMARY OF THE INVENTION

In accordance with the principles of the present invention, an analog rather than a digital signal blending network blends first and second video signal components which represent constituent portions of an image to be displayed. In a disclosed preferred embodiment the first and second components are center panel and side panel components of a widescreen television signal. The first and second components are blended together along a boundary region several picture elements (pixels) wide to reconstitute a video signal representing the image to be displayed. The blending network includes first and second active analog devices which exhibit mutually opposite gain over the boundary region in response to a common gain control signal, to produce a virtually invisible seam along the boundary region. The disclosed apparatus advantageously avoids the need for generating two identical but oppositely phased complementary gain control signals for producing oppositely directed gain characteristics, which could cause an annoying visible seam to appear along the boundary region of a reconstructed image due to minor differences in control signal risetimes and falltimes, for example.

DESCRIPTION OF THE DRAWING

In FIG. 1, a video signal component from a source 10 is subjected to a signal blending process, and a video signal component from a source 35 is subjected to a signal splicing process, both by means of a network 20. An output signal from network 20 is additionally processed in a unit 25 to develop an image representative signal suitable for display by an image display device 30 (e.g., a kinescope). In the case of a color television receiver, separate networks 20 would be used for each of the three red, green and blue color video signal components. Only one of such networks is shown and will be discussed.

Figure 2:
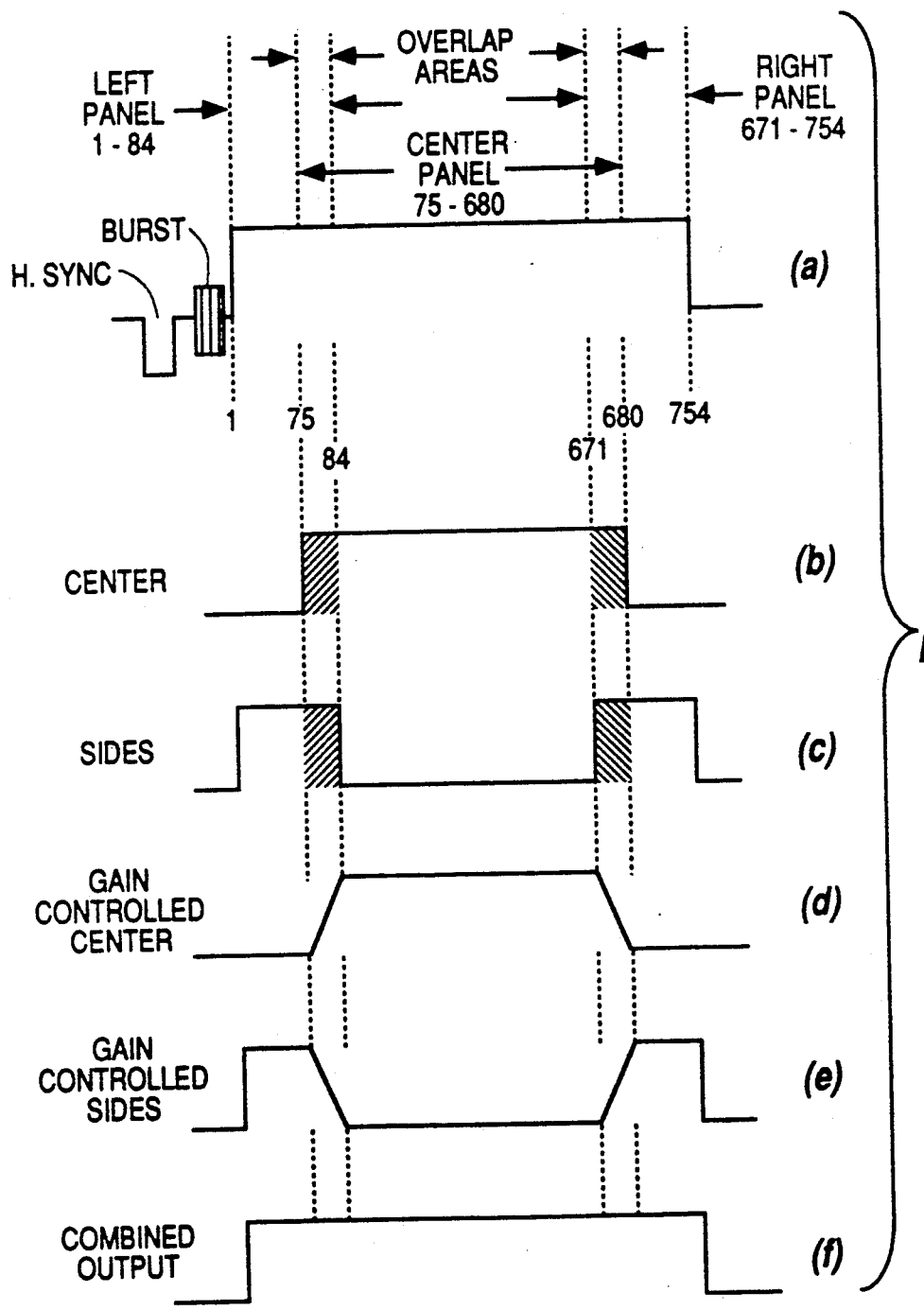
FIGS. 2a-2f, 3a-3e and 6 illustrate signal waveforms helpful in understanding the operation of the disclosed apparatus.

Source 10 provides a widescreen television video signal including a center (main) panel disposed between left and right side panels. As such the widescreen signal exhibits an image aspect ratio (e.g., 5:3) greater than the 4:3 aspect ratio of a standard television signal. The general form of the widescreen video signal from source 10 for one horizontal image line is illustrated by waveform (a) of FIG. 2 as having an active image area encompassing picture elements (pixels) 1-754. The active image area follows a blanking interval including a negative-going horizontal sync pulse followed by a color burst component. The center panel area contains pixels 75 to 680, and the left and right side panel areas contain pixels 1-84 and 671-754 respectively. Side-center pixel overlap areas including pixels 75-84 and 671-680 include both side and center panel information, and facilitate blending and splicing the spatially uncorrelated center and side panel information to help eliminate boundary artifacts.

In this example the side panel information has been separated into low and high frequency components which have been processed separately as disclosed, for example in U.S. Pat. No. 4,816,899—Strolle et al. and in U.S. Pat. No. 4,855,811—Isnardi. Thus source 10 provides a widescreen signal containing center panel information and low frequency side panel information. The remaining high frequency side panel information needed to reconstitute the side panel image components is provided by source 35, and is spliced to the signal from source 10 by means of network 20. Information concerning the nature of the signal processing functions contained in sources 10 and 35, e.g., including time compression, time expansion and demodulation, can be found in the Strolle et al. and Isnardi patents mentioned above.

Figure 3:
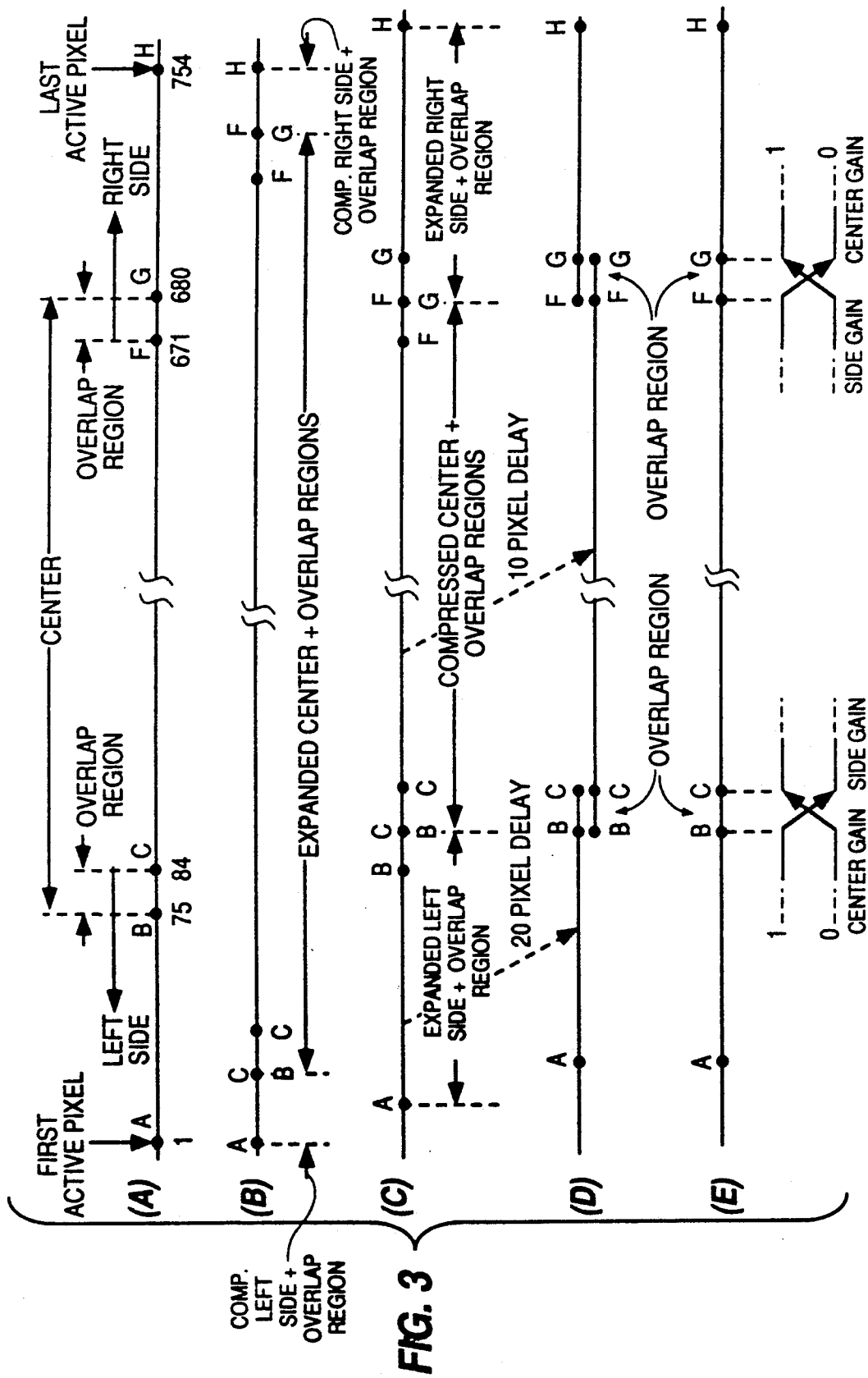

The operation of network 20 with respect to the signal from source 10 is in the nature of a blending operation along a side-center boundary region, and can be explained in the context of signals (A) through (E) of FIG. 3. Signal (A) represents an original widescreen video signal provided by a widescreen video camera, for example. Prior to being broadcast, this signal is converted to a form which is compatible with the requirements of a standard NTSC broadcast television system. As described in the Isnardi patent mentioned above, this involves an encoding process wherein center panel information is time expanded slightly to produce a 4:3 aspect ratio image, left and right side panel low frequency information is time compressed into the left and right horizontal overscan intervals, and side panel high frequency information is time expanded before modulating an auxiliary subcarrier signal. The inverse of each of these functions is performed by a decoder in a widescreen receiver, e.g., in units 10 and 35 in FIG. 1. These functions can be performed digitally, such as explained in the aforementioned Isnardi et al. patent, or by means of analog signal processing, synchronized by a SYNC signal input to unit 10. In the case or analog signal processing, the video signal to be time compressed or time expanded can be written into memory (e.g., 1H video line memory) at a given rate such as four times the frequency of the color subcarrier frequency, and read out one image line later at a variable (faster or slower) rate depending upon whether compression or expansion is to be performed.

The encoded NTSC compatible signal which is transmitted is of the form illustrated by signal (B). Signal (C) represents the decoded widescreen video signal from unit 10, containing center panel and low frequency side panel information. The side panel high frequency information from source 35 is not illustrated.

In signal (A) the left side panel includes region A-C, the center panel region includes region B-G, and the right side panel includes region F-H. Regions BC and FG are left and right side-center overlap regions each ten pixels wide. The signal processing in source 10 (e.g., a decoder in a widescreen receiver) necessary to transform encoded NTSC compatible signal (B) into widescreen signal (C) at the output of unit 10 involves time expanding side panel low frequency information by a factor of about 1:6, and time compressing center panel information slightly. The information contained in overlap regions BC and FG includes both center and side panel information, and therefore is subjected to both time expansion and time compression during the encoding and decoding processes. During subsequent processing to recover the original form of the signal as will be discussed, an overlap condition occurs within regions BC and FG as seen from signal (D). A blending process performed by network 20 removes this otherwise visible overlap condition so as to produce a virtually invisible seam between center and side panel information.

In order to obtain a reconstructed widescreen signal as illustrated by signal (E), the following operations must be performed, notably with respect to side-center overlap regions BC and FG of signal (D) to provide a smooth, invisible transition between the uncorrelated side and center panel information. In this regard reference is made to signals (C), (D) and (E). The center panel information is delayed by 10 pixels in this example, and the left side panel information is delayed by 20 pixels. Right side panel information is not delayed. The signal gain for the left side panel information is caused to decrease from unity to zero in overlap region BC while the signal gain for center panel information simultaneously is caused to increase from zero to unity in left overlap region BC. The gain control function can be substantially linear as shown, or non-linear. A similar signal gain change occurs in right overlap region FG, except that the sense of the gain change is reversed. That is, the center panel and right side panel signal gains respectively decrease from unity to zero and increase from zero to unity. The reconstructed signal is obtained by adding the gain-weighted waveforms. The side panel high frequency component from source 35 undergoes a similar gain-weighting process.

Reconstructed signal (E) is provided by the operation of network 20 in FIG. 1 as follows. The widescreen signal from source 10 is directly applied to first input of a switch 40, and to a second input of switch 40 via delay elements 42 and 44 which provide signal delay values D1 and D2 respectively. The position of switch 40 is controlled by a switch control signal SC which is synchronized by pixel counting circuits (not shown). Control signal SC causes switch 40 to occupy the upper position during the right side panel interval, and the lower position during the left side panel interval. Switch 40 can be in either position during the center panel interval. The output of switch 40 is conveyed via a low pass filter 46 which provides a delay value D3.

When switch 40 is in the lower position, the left side panel component passes through delay elements 42, 44 and 46 to a non-inverting (+) video signal input of an amplifier 52 included in a four quadrant analog signal multiplier 50. The center panel component passes through delay element 42 before being applied to an inverting (−) video signal input of an amplifier 62 included in a four quadrant analog signal multiplier 60. Waveforms (b) and (c) of FIG. 2 respectively illustrate the signals developed at the video signal inputs of amplifiers 62 and 52. When switch 40 is in the upper position as shown, the right side panel component passes through delay element 46 alone before being applied to the non-inverting (+) input of amplifier 52.

The timing of the signals at the non-inverting and inverting video signal inputs of amplifiers 52 and 62 of multipliers 50 and 60 is important for the proper reconstruction of the center-to-side panel overlap regions (BC and FG in signal (E) of FIG. 3). That is, the overlapping side and center panel information (see FIG. 3, signal (D)) must be blended via a process which renders the seam in the side-center overlap region virtually invisible.

The time difference between the video input signals of multipliers 50 and 60 is a 10 pixel delay between the center and left side panel components when switch 40 is in the lower position. The time difference is a 20 pixel delay between the center and right side panel components when switch 40 is in the upper position. Accordingly, delay sum D2+D3 provides a 10 pixel delay, and delay difference D1−D3 provides a 10 pixel delay. In this example delay element 46 is a low pass filter which is used to remove clock signal frequencies associated with previous time expansion networks (not shown). Filter 46 has a cut-off frequency of 700 KHz, which yields a time delay D3 of 350 nanoseconds. In this system a one pixel delay corresponds to 1/fc where fc is a 14.3 MHz clock frequency, or 69.8 nanoseconds. Delays D1 and D2 therefore equal 1048 nanoseconds and 348 nanoseconds, respectively.

A source 70 provides a gain control signal GC with a falling edge associated with a transition from left side panel to center panel information, and a rising edge associated with a transition from center panel to right side panel information. This signal is shaped by a network 74, e.g., a low pass filter, to produce a gain control signal GC' with more gradually sloped edge transitions with reduced rise and fall times over the side-center overlap regions as illustrated. The reduced rise and fall times of signal GC' produce a "soft" response in the side-center overlap regions, thereby facilitating a virtually invisible blending of side and center panel information in the overlap regions. Gain control signal GC' is applied to a non-inverting (+) input of an amplifier 54 in multiplier 50, and to a non-inverting (+) input of an amplifier 64 in multiplier 60, so that the signal gains of amplifiers 54 and 64 are controlled in a mutually inverse fashion.

A multiplier 56 in unit 50 provides the gain-weighted product of output signals from amplifiers 52 and 54, and a multiplier 66 in unit 60 provides the gain-weighted product of output signals from amplifiers 62 and 64. Gain-weighted output signals from units 50 and 60, as represented by waveforms (e) and (d) of FIG. 2 respectively, are combined by an adder 90 to produce a reconstructed widescreen signal as indicated by waveform (f) in FIG. 2. DC offset controls 58, 68, 82 and 84 help compensate for component tolerance effects and establish the gain control characteristics of devices 50 and 60.

Unit 58 provides a DC offset voltage of approximately 0.0 volts at the inverting input of device 54, and unit 68 provides a DC offset voltage of approximately +2.0 volts at the inverting input of device 64. When multiplier unit 50 is conducting during side panel intervals, the gain control signal (GC') appearing at the non-inverting input of device 54 is more positive than the DC offset voltage appearing at the inverting input of device 54. As a result, the video signal applied to the non-inverting input of device 52 is multiplied by a positive factor, and a positive video output signal is produced. When multiplier unit 60 is conducting during center panel intervals, the gain control signal at the non-inverting input of device 64 is less positive than the DC offset voltage appearing at the inverting input of device 64. As a result, the video signal applied to the inverting input of device 62 is multiplied by a negative factor, and a positive video output signal is produced.

The side panel high frequency component from source 35 is coupled via an AC coupling capacitor 86 to an inverting (−) input of amplifier 52 where the side highs component is combined with the side lows component. The high frequency side panel component is spliced to the center panel component via a gain weighted blending process as discussed previously with regard to the low frequency side panel component.

Figure 1:
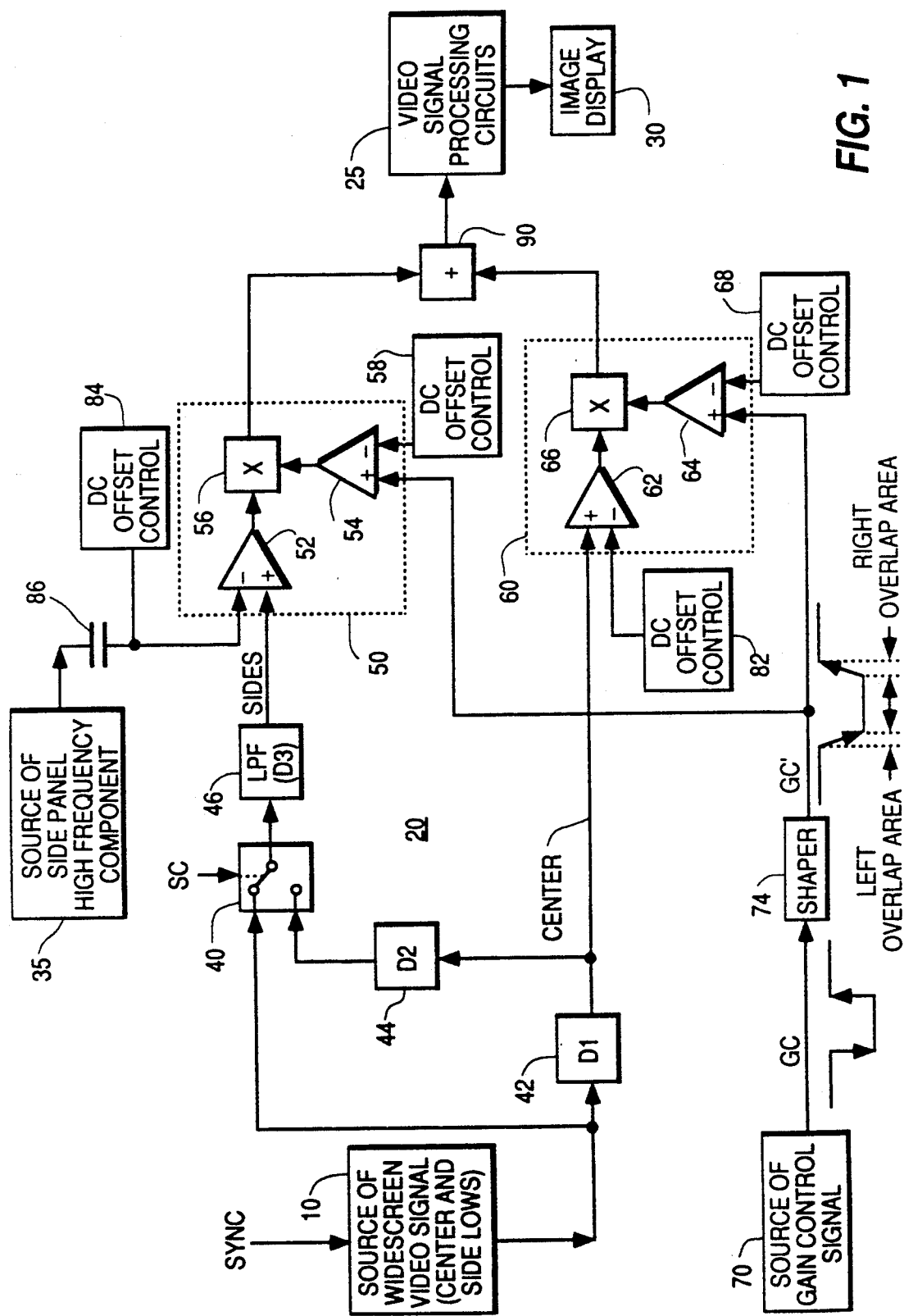
FIG. 1 shows a block diagram of a portion of a television receiver including image signal blending apparatus according to the present invention.
Figure 4A:
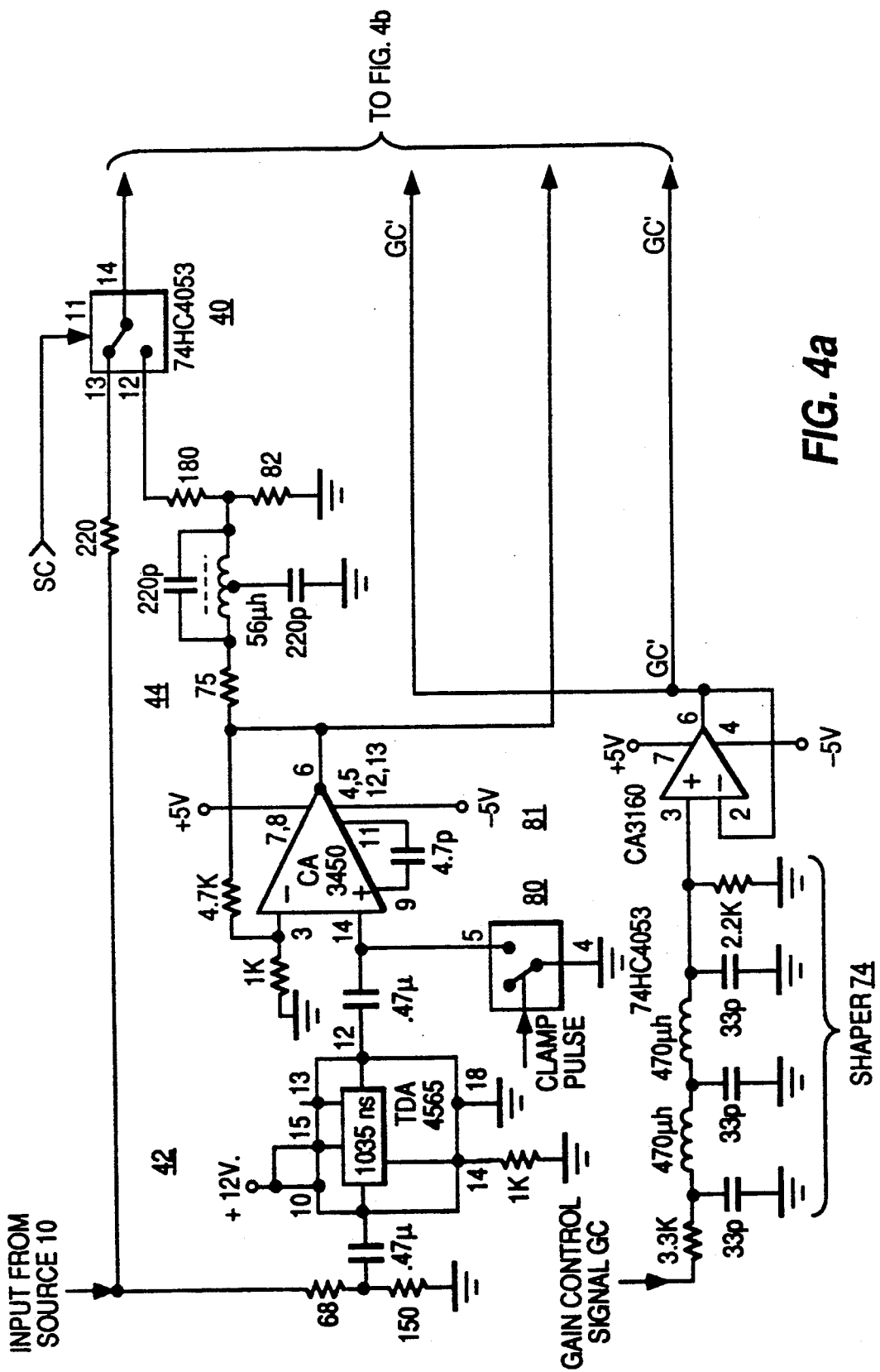
FIGS. 4a and 4b show aspects of the apparatus of FIG. 1 in greater detail.
Figure 4B:
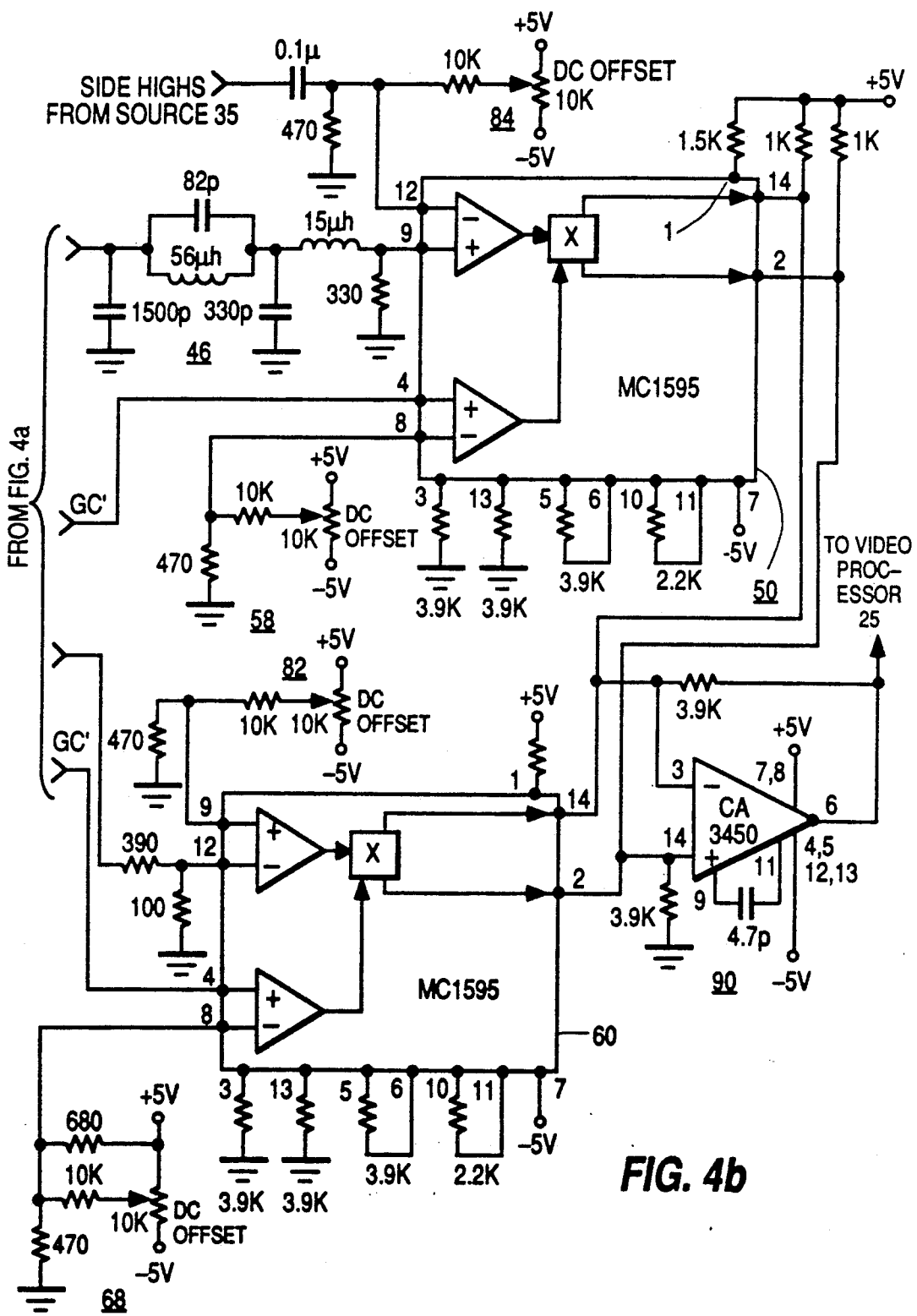

FIGS. 4a and 4b shows additional details of splicing network 20 of FIG. 1, wherein corresponding elements are identified by the same reference number. Outputs of units 40 and 81 in FIG. 4a are respectively applied to an input of a filter 46 in FIG. 4b, and to an input terminal 12 of unit 60 in FIG. 4b. Signals GC' from FIG. 4a are applied to elements of FIG. 4b as shown. In FIG. 4a, the input signal from source 10 is AC coupled to delay unit 42, which is a gyrator type device commercially available from Phillips Corporation. A 1035 nanosecond delay available from this device is slightly less than the calculated value of 1048 nanoseconds needed for delay D1. However, it has been observed that the 13 nanosecond difference between the calculated and available delay values does not compromise the desired operation of network 20. A delay deviation of up to 35 nanoseconds was found to be tolerable.

The output signal from delay unit 42 is clamped to ground reference potential during horizontal blanking intervals by a network including a switch 80, so that the input signals to switch 40 exhibit substantially equal black reference levels. The clamped signal is amplified by a low output impedance amplifier 81, a commercial RCA device. Unit 44 which provides delay value D2 is an all-pass network with respect to the 700 KHz input signal. Switch 40, a commercial RCA device, is an electronic gate which selects between the two sidepanel signals as explained previously. Multipliers 50 and 60, both commercially available from Motorola Corporation, have balanced inverting and non-inverting signal inputs and balanced inverting and non-inverting gain control inputs. Output signals from multipliers 50 and 60 are combined in a low output impedance amplifier 90, a commercial RCA device which is capable of directly driving a video signal input of a video monitor if necessary.

Figure 5:
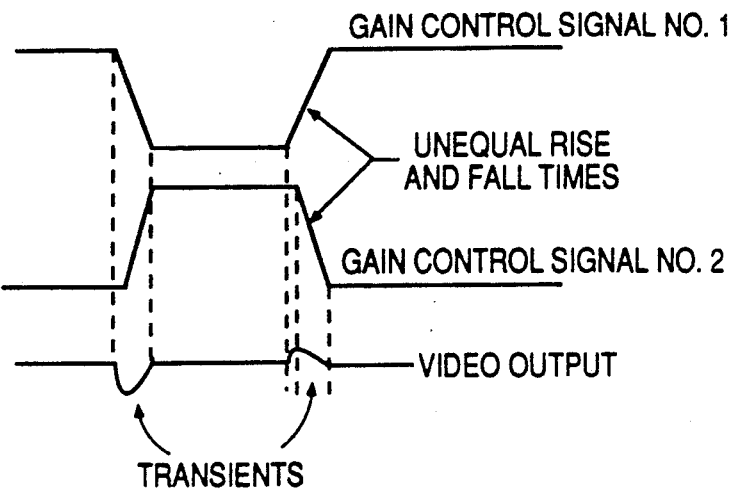
Figure 6:
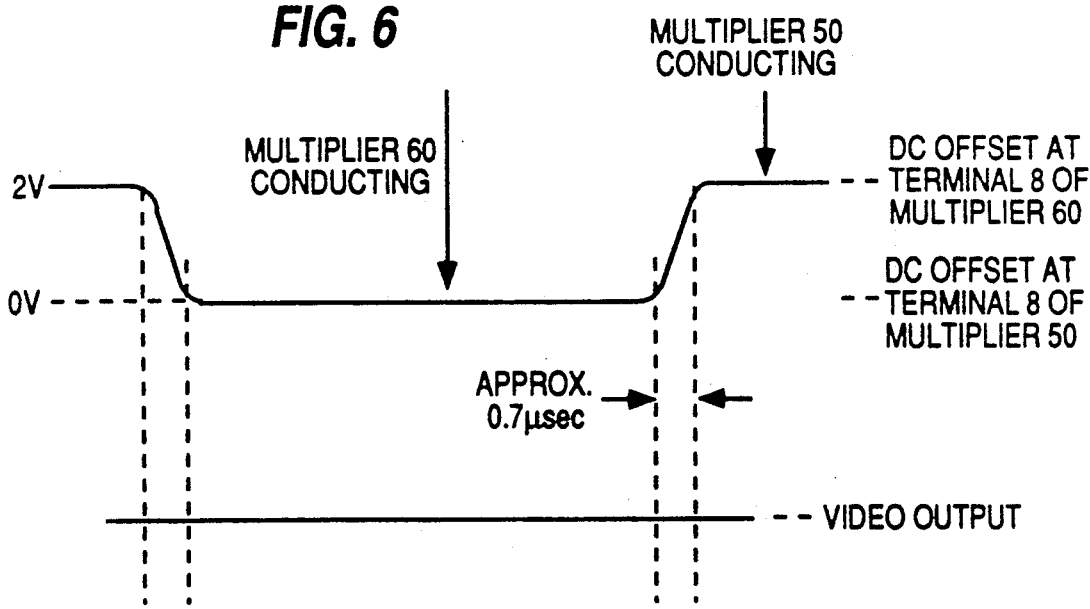

Multipliers 50 and 60 could be gain controlled in response to a pair of oppositely phased control signals since only one device is fully conducting at a time, except in the overlap region where the gain of one device increases as the gain of the other device decreases, and vice-versa. However, it has been found to be very difficult to generate two identical but oppositely phased control signals. Minor differences in the rise or fall times of the gain control signals are typically encountered and can produce transient artifacts in the overlapping side-center boundary regions of a reconstructed widescreen signal, resulting in an annoying visible seam as depicted by FIG. 5. In contrast, in the disclosed apparatus the same signal (GC') is used to control the signal gains of multipliers 50 and 60 simultaneously for producing a virtually invisible seam along the overlapping side-center boundary region, as depicted by the lower waveform of FIG. 6.

The gain control characteristics of devices 50 and 60 are determined by DC offsets voltages provided by offset networks 58 and 68 to terminal 8 of device 50 and to terminal 8 of device 60, respectively. The offset voltage provided to terminal 8 of device 50 corresponds to the minimum value (0.0 volts) of gain control signal GC', and the offset voltage provided to terminal 8 of device 60 corresponds to the maximum value (+2.0 volts) of gain control signal GC'. Thus, devices 50 and 60 are respectively conductive and non-conductive in response to the maximum level of control voltage GC'. Conversely, devices 50 and 60 are respectively non-conductive and conductive in response to the minimum level of control signal GC'. Gain control signal GC' could also be applied to inputs of devices 54 and 64 which are mutually opposite in phase, and the video signal could be applied to inputs of devices 52 and 62 which are similarly phased.

The high frequency side panel component from source 35 is applied to the signal inverting input of device 50 (terminal 12), rather than to the non-inverting input (terminal 9), to avoid interaction with filter 46.

What is claimed is:
1. Video signal processing apparatus comprising:
   a first gain controllable analog device having a gain control input, and a signal input for receiving a first video signal component;
   a second gain controllable analog device having a gain control input, and a signal input for receiving a second video signal component, said first and second video signal components representing spatially distinct constituent parts of an image to be displayed and sharing a common boundary region containing plural picture elements (pixels);
   means for coupling a gain control signal in common to gain control inputs of said first and second devices for controlling the signal gains of said devices in mutually opposite directions over said boundary region; and means for combining output signals from said first and second devices.

2. Apparatus according to claim 1, wherein said first and second analog devices are four quadrant signal multipliers each having inverting and non-inverting gain control inputs and inverting and non-inverting signal inputs;

said gain control signal is applied to similarly phased gain control inputs of said first and second devices;

said first video signal component is applied to one of said signal inputs of said first device; and said second video signal component is applied to one of said signal inputs of said second device which is oppositely phased relative to said signal input of said first device to which said first video signal component is coupled.

3. Apparatus according to claim 1, wherein said first and second devices exhibit a substantially linear ramp-like gain characteristic over said boundary region in response to said gain control signal.

4. Apparatus according to claim 1, wherein said first video signal component is a side panel image information component of a video signal;

said second video signal component is a center panel image information component of said video signal; and said common boundary region contains side panel and main panel image information.

5. Apparatus according to claim 4, wherein said video signal is a widescreen video signal having an image aspect ratio greater than a standard 4:3 image aspect ratio.

6. In a system for processing a widescreen television-type video signal containing a side panel image information component and a main panel image information component, said side panel component and said main panel component sharing a common boundary region containing plural picture elements; apparatus comprising:

a first gain controllable analog device having a gain input, and a signal input for receiving said side panel component;

a second gain controllable analog device having a gain control input, and a signal input for receiving said main panel component;

means for coupling a gain control signal in common to gain control inputs of said first and second devices for controlling the signal gains of said devices in mutually opposite directions over said boundary region; and means for combining output signals from said first and second devices.

7. Apparatus according to claim 6, wherein said first and second analog devices are four quadrant signal multipliers each having inverting and non-inverting signal inputs and gain control inputs.

8. Apparatus according to claim 6, wherein said first and second devices exhibit a substantially linear ramp-like gain characteristic over said boundary region in response to said gain control signal.

9. Apparatus according to claim 6 and further including:

switch means having first and second inputs and an output;

means for coupling said widescreen signal to said first input of said switch means;

delay means for coupling said widescreen signal to said second input of said switch means;

means for controlling said switch means to provide right side panel information at said switch output during intervals containing right side panel information, and left side panel information at said switch output during intervals containing left side panel information;

means for coupling said output of said switch means to said signal input of said first device; and means coupled to said delay means for providing main panel information to said signal input of said second device.

10. Apparatus according to claim 9, wherien said delay means includes first and second delay means;

said providing means is coupled from a point between said first and second delay means to said signal input of said second device; and said means for coupling said output of said switch means to said signal input of said first device includes further delay means.

* * * * *